(12) United States Patent
Grundhofer

(10) Patent No.: US 9,319,649 B2
(45) Date of Patent: Apr. 19, 2016

(54) PROJECTOR DRIFT CORRECTED COMPENSATED PROJECTION

(71) Applicant: Disney Enterprises, Inc., Burbank, CA (US)

(72) Inventor: Anselm Grundhofer, Greifensee (CH)

(73) Assignee: DISNEY ENTERPRISES, INC., Burbank, CA (US)

( * ) Notice: Subject to any disclaimer, the term of this patent is extended or adjusted under 35 U.S.C. 154(b) by 105 days.

(21) Appl. No.: 14/180,124

(22) Filed: Feb. 13, 2014

(65) Prior Publication Data

US 2015/0229896 A1     Aug. 13, 2015

(51) Int. Cl.
     *G03B 21/14*      (2006.01)
     *H04N 9/31*      (2006.01)
     *H04N 1/60*      (2006.01)

(52) U.S. Cl.
     CPC ............. *H04N 9/3182* (2013.01); *H04N 1/60* (2013.01)

(58) Field of Classification Search
     CPC . H04N 9/12; H04N 9/3147; H04N 2005/745; H04N 2005/7466
     USPC .......... 353/30, 69–70; 348/743–747, E5.137, 348/E9.012, E9.025
     See application file for complete search history.

(56) References Cited

U.S. PATENT DOCUMENTS

| 8,102,584 | B2 | 1/2012 | Bolle et al. | |
|---|---|---|---|---|
| 2002/0024640 | A1 | 2/2002 | Ioka | |
| 2003/0025837 | A1* | 2/2003 | Krogstad et al. | 348/674 |
| 2004/0036813 | A1* | 2/2004 | Matsuda | 348/744 |
| 2004/0140981 | A1* | 7/2004 | Clark | 345/600 |
| 2004/0140982 | A1 | 7/2004 | Pate | |
| 2007/0171380 | A1* | 7/2007 | Wright | G03B 21/14 353/69 |
| 2009/0115915 | A1* | 5/2009 | Steinberg | H04N 9/3194 348/745 |
| 2009/0174638 | A1 | 7/2009 | Brown Elliott et al. | |
| 2011/0175925 | A1 | 7/2011 | Kane et al. | |
| 2013/0222386 | A1 | 8/2013 | Tannhauser et al. | |

OTHER PUBLICATIONS

Aliaga, Daniel G. et al., "Fast High-Resolution Appearance Editing Using Superimposed Projections", ACM Trans. Graph., 31, 2, 13:1-13:13, Apr. 2012.

Bimber, Oliver et al., "Embedded Entertainment with Smart Projectors", Computer, IEEE Computer Society, Jan. 2005, 48-55.

Bimber, Oliver, "The Visual Computing of Projector-Camera Systems", STAR—State of the Art Report, Eurographics 2007.

Chen, Xinli et al., "Color Mixing Property of a Projector-Camera System", School of Software, Aug. 10, 2008, 1-6.

Dold, A. et al., "Lecture Notes in Mathematics", Constructive Theory of Functions of Several Variables, Proceedings of a Concerence, Held at Oberwolfach, Apr. 25-May 1, 1976.

Fujii, Kensaku et al., "A Projector-Camera System with Real-Time Photometric Adaptation for Dynamic Environments", Proceedings of the 2005 IEEE Computer Societ Concernce on Computer Vision and Pattern REcognition, 2005.

Grundhofer, Anselm et al., "Real-Time Adaptive Radiometric Compensation", IEEE Transactions on Visualization and Computer Graphics, vol. 14, No. 1, Jan./Feb. 2008, 97-108.

(Continued)

*Primary Examiner* — Sultan Chowdhury
(74) *Attorney, Agent, or Firm* — Dorsey & Whitney LLP

(57) ABSTRACT

The present invention relates generally to adjusting projected images from a projector. A projected image is compensated to neutralize effects of a projection surface and optimized based on anticipated pixel drift movement.

22 Claims, 18 Drawing Sheets
(10 of 18 Drawing Sheet(s) Filed in Color)

(56) References Cited

OTHER PUBLICATIONS

Guehring, Jens, "Reliable 3D Surface Acquisition, Registration and Validation using Statistical Error Models", Third International Conference on 3-D Digital Imaging and Modeling May 28-Jun. 1, 2001 Quebec City, Canada.

Hardy, R. L., "Theory and Applications of the Multiquadric-Biharmonic Method", Computers Math. Applic. vol. 19, No. 8/9, 1990, 163-208.

Majumber, Aditi et al., "Color Nonuniformity in Projection-Based Displays: Analysis and Solutions", IEE Transactions on Visualization and Computer Graphics, vol. XX, No. Y,, 2003, 100-111.

Park, Sun Jee et al., "Adaptive Chrominance Correction for a Projector Considering Image and Screen Color", ISVC 2007, Part II, LNCS 4842, 2007, 751-759.

Powell, M.J.D., "The BOBYQA algorithm for bound constrained optimization without derivatives", DAMTP 2009/NA 06, Department of Applied MAthematics and Theoretical Physics, Aug. 2009, 1-39.

Sharma, G. et al., "The ciede2000 color-difference formula: Implementation notes, supplementary test data and mathematical observations", Color Research and Application, 30, 1, 2005, 21-30.

Shepard, Donald, "A two-dimensional interpolation function for irregularly-spaced data", Proceedings—1968 ACM National Conference, 1968, 517-524.

Ashdown, Mark et al., "Robust Content-Dependent Photometric Projector Compensation", Computer Vision and Pattern Recognition Workshop Conference, Jun. 17-22, 2006, pp. 1-8. New York City, NY USA.

Donato, Gianluca et al., "Approximate Thin Plate Spline Mappings", Proceedings of the 7th European Conference on Computer Vision (ECCV 2002), Part III, LNCS 2352, Apr. 29, 2002, pp. 1-11.

Hutchison, David C., "Introducing BrilliantColor Technology", Texas Instruments DLP Products, Dec. 29, 2005, pp. 1-5. Dallas, TX USA.

Nayar, Shree K. et al., "A Projection System with Radiometric Compensation for Screen Imperfections", Department of Computer Science, Columbia University. Proceedings of International Workshop on Projector-Camera Systems, Oct. 2003, pp. 1-8. New York City, NY, USA.

Sajadi, Behzad et al., "ADICT: Accurate Direct and Inverse Color Transformation", Proceedings of European Conference on Computer Vision. Sep. 5-11, 2010, pp. 1-14.

Wang, Dong et al., "Radiometric Compensation in a Projector-Camera System Based on the Properties of Human Vision", Proceedings of IEEE International Workshop on Projector-Camera Systems, Jun. 25, 2005, pp. 1-7.

Wetzstein, Gordon et al., "Radiometric Compensation Through Inverse Light Transport", Proceedings of the 15th Pacific Conference on Computer Graphics and Applications. Oct. 29-Nov. 2, 2007, pp. 1-8.

Yoshida, Takenobu et al., "A Virtual Color Reconstruction System for Real Heritage with Light Projection", Proceedings of International Conference on Virtual Systems and MultiMedia, 2003, pp. 1-7.

* cited by examiner

_US 9,319,649 B2_

PROJECTOR DRIFT CORRECTED COMPENSATED PROJECTION

FIELD

The present invention relates generally to adjusting projected images from a projector, and more specifically to compensating projected images to neutralize effects of a projection surface and to optimizing the compensated images based on anticipated pixel drift movement.

BACKGROUND

Photometric projector compensation is used in various fields such as entertainment, cultural heritage, and augmented reality. The purpose of photometric projector compensation is to adjust one or more projected images from a projector in order to account for variations in the characteristics from one projector to another, variations in projection surfaces (e.g., color, material, and/or texture), and the like. By compensating one or more images to account for variations, the images reflected or transmitted from the projection surface may better correspond to a desired image.

Compensating an image to account for variations in the projection surface without accounting for potential pixel movement can lead to errors in the projected image in some instances. For example, when a color mapping is used to compensate for colors in the projection surface, pixel movement can cause the color mapping to become uncorrelated with the underlying colors of the projection surface. As the compensated image is projected, pixel movement causes color compensated pixels to be projected erroneously onto incorrect color regions of the projection surface. As a result, lines or regions of erroneous color can appear in the image that is reflected or transmitted from the projection surface.

It is with these shortcomings in mind that the present invention has been developed.

SUMMARY

One embodiment of the present disclosure may take the form of a projection method, comprising compensating an input image based on at least one characteristic of a projection surface to form a compensation image; optimizing the compensation image based on a pixel drift estimation to form an optimized compensation image; and projecting the optimized compensation image onto the projection surface.

Another embodiment of the disclosure may take the form a projection method, comprising calculating a drift map for each of a plurality of projector pixels, each drift map including pixel drift locations each assigned a probability that represents a likelihood that the projector pixel will drift to the pixel drift location; and determining an intensity for each color channel of each projector pixel by applying the drift maps to a per-pixel color mapping data set used to color compensate an input image based on colors of a projection surface.

Yet another embodiment of the disclosure may take the form of a projection method, comprising sampling over time of plurality of movements of a pixel between a projector plane and a camera plane; for each location to which the pixel moved at least once, storing the location as a pixel drift location; for each pixel drift location, storing a probability that represents a frequency with which the pixel moved to the pixel drift location to form a pixel drift map; and selecting an intensity for the color channels of the pixel based on the pixel drift map and a color mapping for the pixel from the projector plane to the camera plane across a projection surface.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

SPECIFICATION

Overview

The present disclosure is related to a system for optimizing compensation images for projection by a projector onto a surface. Photometric compensated projectors substantially neutralize the projection surface onto which the images are projected. For example, the compensated images reduce the appearance of a non-perfectly white and/or textured surface such that the projected images and the images reflected or transmitted from the projection surface more accurately correspond to the desired output of an image. The methods and systems are described herein primarily with reference to a front projection type system with a reflective projection surface, however, the systems, methods and devices described herein are readily translated to a rear projection system where the projection surface is transmissive or diffusive rather than reflective. The methods and systems disclosed herein optimize these compensated images to account for projector pixel movement.

An example system may include a projector, a camera, and a computer. Each of the elements of the system may be in communication with each other, either directly or indirectly. In one respect, the system may be used to create compensation images that allow images projected by the projector to be varied in order to accommodate variations or discontinuities on a projection surface, e.g., wall, surface, or the like. In another respect, the system may be used to create a pixel drift description that is used to optimize the compensation images before projection. The system may create one or more pixel drift maps for the pixel drift description by projecting test images or structures light patterns onto the projection surface. The camera captures reflected images as they are appear to the camera field of view (FOV) when projected onto the projection surface. The computer uses the reflected images to measure pixel drift movement that occurs between the projector plane and the camera plane. The computer combines a number of such measurements taken over a predetermined time to form a probabilistic description of how projector pixels move.

In one embodiment, the computer optimizes the compensation image by calculating all possible shifts of a per-pixel color mapping data set based on one or more drift maps. The computer then compares a shifted color that results from each possible shift with a desired color and assigns the difference between the shifted color and the desired color as an error. Following this, the computer weights each error by the probability assigned in the drift map to the corresponding pixel drift location. Finally, the computer calculates an intensity for each projector pixel color channel using the weighted errors.

DETAILED DESCRIPTION

Figure 1:
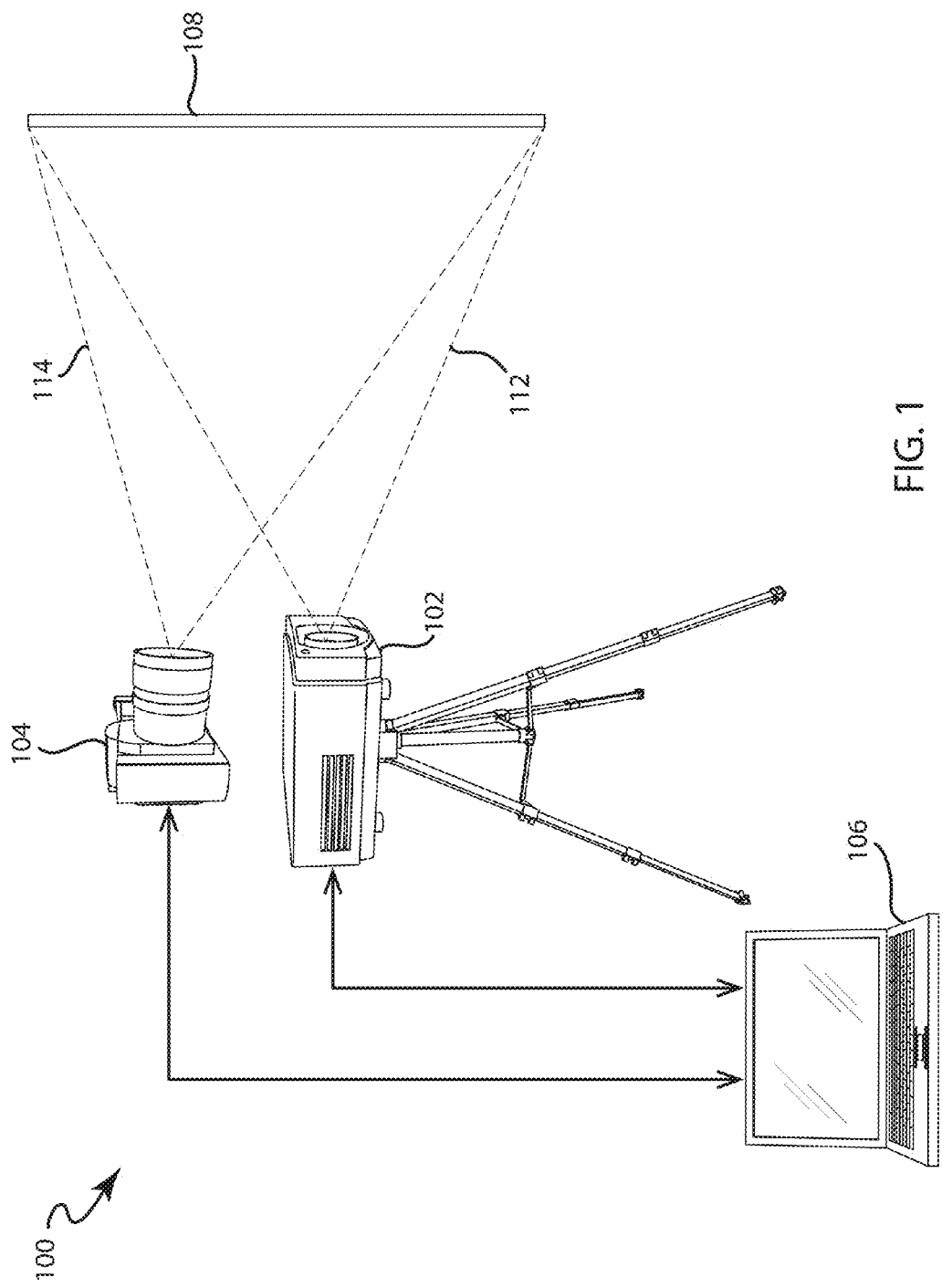
FIG. 1 is a perspective view of a system for photometrically calibrating a projector.
Figure 2:
FIG. 2 is a front elevation view of an image being projected by the projector of FIG. 1 onto a projection surface.

Turning to the figures, the optimization system will be discussed in more detail. FIG. 1 is a perspective view of the optimization system. FIG. 2 is a front elevation view of a projected image on a projection surface. Referring to FIGS. 1 and 2, the system 100 includes a projector 102, a camera 104 and a computer 106. The projector 102 and camera 104 include FOVs 112, 114 that are directed towards a projection surface 108 allowing the projector 102 to project a projection image 110 onto the projection surface 108 and allowing the camera 104 to capture one or more images of the projection image 110 reflected from projection surface 108. The position of the projector 102 and the camera 104 can be varied as desired. For example, in many instances the camera 104 may be located from the position of a representative viewer (e.g., audience member). This allows the camera 104 to capture the projected images from the viewpoint of an audience member such that the compensation images may be adjusted for the point of view of the audience member. In other examples, the camera 104 may be aligned with the projector 102 such that the FOV 112, 114 of each device generally corresponds to each other. This configuration may be better suited for arbitrary viewing locations as the compensation of the projector 102 will be done from the FOV that corresponds to the projector lens. Accordingly, in instances where the location of a viewer may not be known or may change over time, the camera and the projector may have FOVS 112, 114 that are generally aligned with one another. The above examples are only two potential configurations of the camera and the projector and the position of the camera 104 and the projector 102 may be otherwise varied. Additionally, although only a single projector 102, camera 104 and computer 106 are illustrated, the system 100 may include substantially any number of each respective devices 102, 104 and 106 as desired. For example, the system 100 may include two or more cameras 104 in order to capture different images of the projected image 110, which may allow image variations due to characteristics of the camera to be more easily filtered out.

The projection surface 108 may be substantially any type of surface. In many instances the projection surface 108 may be a textured, off-white, colored, or other non-ideal reflective projection surfaces. For example, the projection surface 108 may be substantially any planar or arbitrarily shaped surface with sufficient diffuse reflectance to form an image in a given environment. It should be noted that the projection surface 108 may be white and may not include much, if any, surface reflectance (i.e., be relatively smooth), but in these instances the images from the projector may not require a substantial amount of compensation. In other words, the methods and system disclosed herein has a larger effect in compensating projection images that are projected onto non-ideal surfaces. Additionally, the methods and system disclosed herein may be used for projectors that use rear projection. In these instances, the rear projection surface may be transmissive with sufficient diffusivity to allow an image to be formed.

Figure 3:
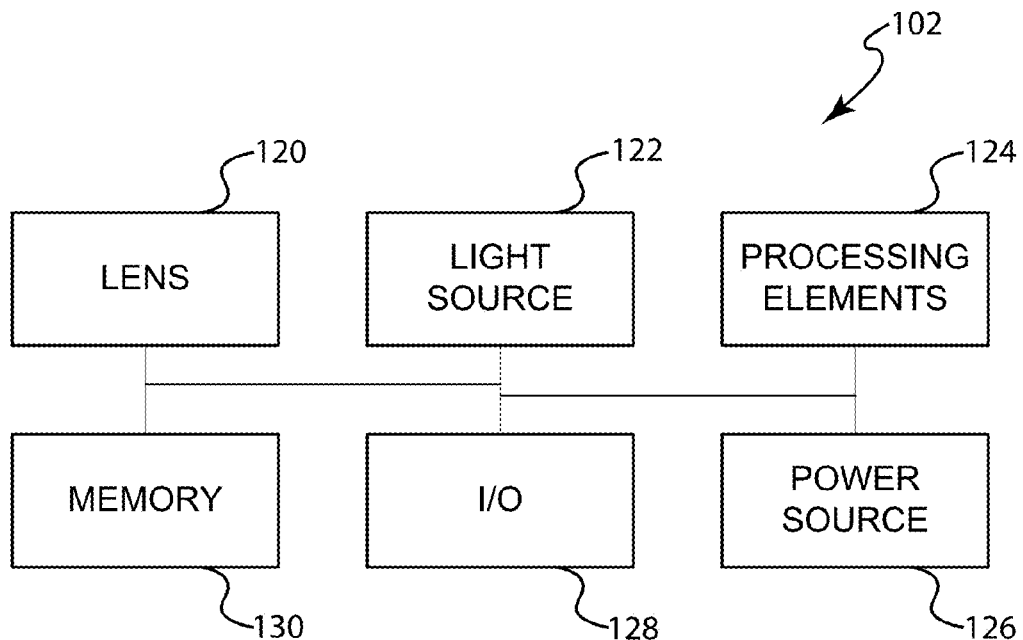
FIG. 3 is a simplified block diagram of the projector of FIG. 1.

The projector 102 can be any device configured to project and spatially control light. In some examples, the projector 102 may be a digital light processing (DLP) projector. FIG. 3 is a simplified block diagram of the projector 102. With reference to FIG. 3, the projector 102 may include one or more processing elements 124, one or more memory components 130, a lens 120, a light source 122, an input/output interface 128, and/or a power source 126. Each of the components of the projector 102 will be discussed in more detail below.

The processing element 124 can be substantially any electronic device capable of processing, receiving, and/or transmitting instructions. The memory 130 stores electronic data that is used by the projector 102. The input/output interface 128 provides communication to and from the projector 102, the camera 104, and/or computer 106, as well as other devices. The input/output interface 128 can include one or more input buttons, a communication interface, such as WiFi, Ethernet, or the like, as well as other communication components such as universal serial bus (USB) cables, or the like. The power source 126 may be a battery, power cord, or other element configured to transmit power to the components of the projectors.

The light source 122 is any type of light emitting element, such as, but not limited to, one or more light emitting diodes (LED), incandescent bulbs, halogen lights, lasers, or the like. The lens 120 is in optical communication with the light source and transmits light from the source 122 to a desired destination, in this case, the projection surface 108. The lens 120 varies one more parameters to affect the light, such as focusing the light at a particular distance. However, in some instances, such as when the projector is a laser projector, the lens may be omitted.

The projector 102 may also include a white balance adjustment or other color balance feature that can be adjusted automatically and/or manually. This allows the white point of the projector to be applied so as to avoid color shifts that are visible by a human observer.

The camera 104 is configured to capture images. The camera 104 typically includes a lens and an image sensor. The type of image sensor and lens are typically varied based on the camera. In many examples the camera 104 is configured to capture color images; however, in other embodiments the camera may be monochromatic and one or more color filers can be used over the camera's lens to capture color images. It is desirable for the image sensor of the camera 104 to be able to capture the entire dynamic range of the projector 102 without severe clipping.

Figure 4:
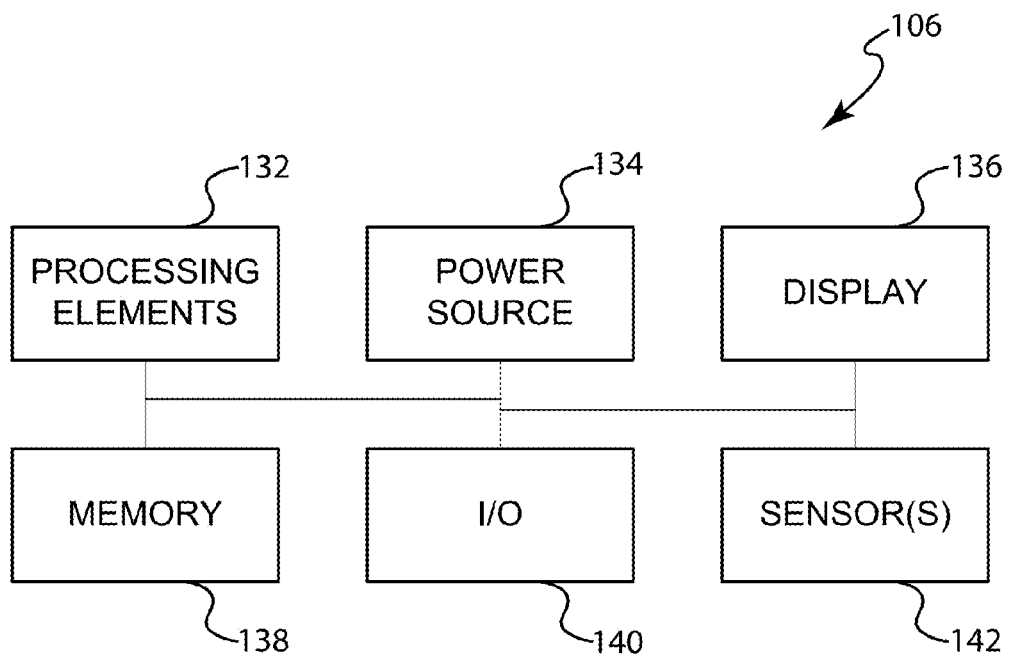
FIG. 4 is a simplified block diagram of a computer of FIG. 1.

Projector 102 and the camera 104 are in communication with one or more computers 106. In the example shown in FIG. 1 only one computer 106 is shown, but it should be noted that two or more computers may also be used. FIG. 4 is a simplified block diagram of the computer 106. With reference to FIG. 4, the computer 106 may include one or more processing elements 132 that are capable of processing, receiving, and/or transmitting instructions. For example, the processing elements 132 may be a microprocessor or microcontroller. Additionally, it should be noted that select components of the computer 106 may be controlled by a first processor and other components may be controlled by a second processor, where the first and second processors may or may not be in communication with each other.

The computer 106 may also include memory 138, such as one or more components that store electronic data utilized by the computer 106. The memory 138 may store electrical data or content, such as, but not limited to, audio files, video files, document files, and so on, corresponding to various applications. The memory 138 may be, for example, magneto-optical storage, read only memory, random access memory, erasable programmable memory, flash memory, or a combination of one or more types of memory components. In some embodiments, the memory component may be required to store 254*3 floating point values for each pixel, which depending on the resolution of the projector may require several gigabytes of memory. Accordingly, in some instances, the memory component 138 may be sufficiently large to handle this type of data storage, but can be adjusted based on the resolution of the projector and/or camera or based on other factors.

Computer 106 includes a power source 134 that provides power to the computing elements and an input/output interface 140. The input/output interface 140 provides a communication mechanism for the computer 106 to other devices, such as the cameras and/or projectors, as well as other components. For example, the input/output interface may include a wired, wireless, or other network or communication elements.

Optionally, the computer 106 can include or be in communication with a display 136 and have one or more sensors 142. The display 136 provides a visual output for the computer 106 and may also be used as a user input element (e.g., touch sensitive display). The sensors 142 include substantially any device capable of sensing a change in a characteristic or parameter and producing an electrical signal. The sensors 142 may be used in conjunction with the cameras, in place of (e.g., image sensors connected to the computer), or may be used to sense other parameters such as ambient lighting surrounding the projection surface 108. The sensors 142 and display 136 of the computer 106 can be varied as desired to meet the needs of a particular application.

Figure 5:
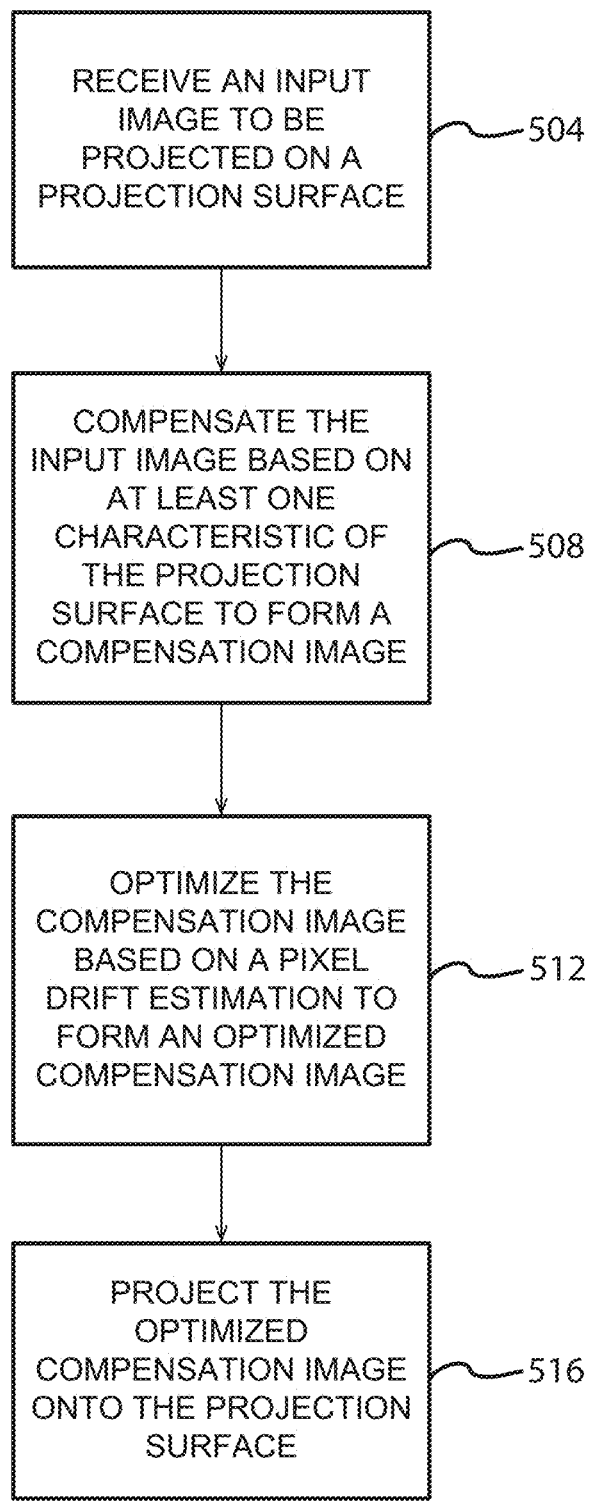
FIG. 5 is a flow chart that illustrates a method of projecting an image on projection surface in accordance with embodiments discussed herein.

FIG. 5 is a flow that illustrates a method of projecting an image on projection surface in accordance with embodiments discussed herein. In operation 504, the projector 102 receives an input image to be projected on a projection surface 108. The input image may be a formatted data set that when processed by the projector 102 causes the projector 102 to project a light pattern that substantially results in a projection image 110 becoming visible at the projection surface 108 as shown in FIG. 2. The input image may be a picture or an otherwise still image that remains constant over time when projected onto the projection surface 108. Alternatively, the input image may be an individual frame of a movie or motion picture such that the projection 110 visible on the projection surface 108 changes over time. Following operation 504, operation 508 is executed.

Figure 6A:
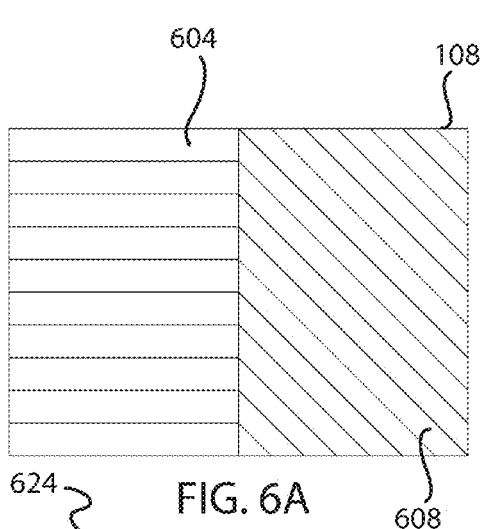
FIG. 6A is a front elevation view of an example projection surface that includes regions of differing color.
Figure 6B:
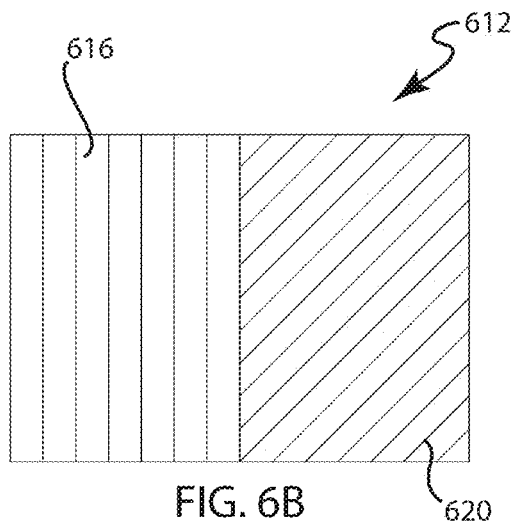
FIG. 6B is a front elevation view of an example color mapping that includes regions of differing color that are compensatory to the colors of the projection surface of FIG. 6A.

In operation 508, the computer 106 compensates the input image based on at least one characteristic of the projection surface 108 to form a compensation image. In forming the compensation image, the computer may account for projection surface 108 characteristics such as color or texture. For example, as shown in FIG. 6A, the projection surface 108 may include a first region 604 having a first color, and a second region 608 having a second color. In operation 508, the computer 106 adjusts the colors in the input image based on a color mapping that is calculated to neutralize or otherwise cancel out the colors that are present in the projection surface 108. FIG. 6B shows an example color mapping 612 that includes a first region 616 having a third color, and a second region 620 having a fourth color. The third color is calculated to be compensatory to the first color in the projection surface 108. Similarly, the fourth color is calculated to be compensatory to the second color in the projection surface 108.

Figure 6C:
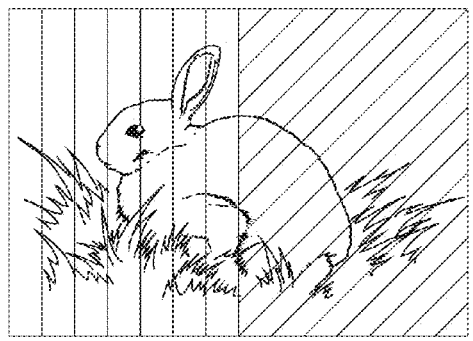
FIG. 6C is a front elevation view of an example color compensation image formed using the color mapping of FIG. 6B.

When the computer 106 adjusts the input image, the computer 106 applies the color mapping 612 to the input image to form a compensation image having the colors of the desired image overlain with the colors of the mapping 612. An example color compensation image 624 is shown in FIG. 6C. The compensation image 624 is calculated such that when projected, the colors of the projection surface 108 add to the compensating colors in the compensation image 624 to balance each other, in the image reflected from the projection surface 108. The desired image, or in other words the image intended to be seen, is reflected such that only the colors in the desired image are seen.

Figure 6D:
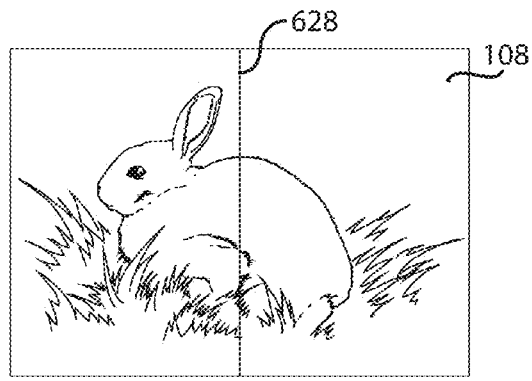
FIG. 6D is a front elevation view of an example projection image resulting from projection of the compensation image of FIG. 6C without first optimizing the compensation image.

Mapping 612 is performed at a selected level of granularity, such as a pixel-level granularity or a block of pixel granularity. Higher granularity allows for more detailed compensation, however, higher granularity implies that registration between the projector 102 and the projection surface 108 will be rigorously maintained during operation to ensure that the mapping 612 remains valid. Movement of one or more pixels in the projector 102 (or, alternatively or in addition movement of projection surface 108) could cause certain color errors to occur in the image reflected from the projection surface 108. For example, as shown in FIG. 6D, a visible line 628 of color may appear due to color errors located in the area where the first 604 and second 608 color regions meet. The visible line 628 can appear when projector pixel movement causes a mismatch between the color mapping 612 and the various color regions of the projection surface 108. In other words, the color mapping 612 may amplify errors that occur due to projector pixel movement because a pixel having a color calculated to compensate the first color of the first region 604 is erroneously projected into the second region 608 having the second color. To the extent that the color added to the pixel and the second color are not compensatory, a visible color error line 628 may appear in the image reflected from the projection surface 108.

The present disclosure includes techniques that allow fine granularity, even pixel level granularity, while at the same time improving robustness of the compensation when faced with the likelihood that projector movement and/or projection surface movement will occur during operation. The projector pixel movement itself may have various causes. In some cases, the projector 102 may shake or vibrate as the image is projected onto the projection surface 108. Projector vibration may result from vibrations imparted to the projector 102 from an external source. For example, the projector 102 may be nearby where heavy trucks or trains operate, where earthquakes occur, and so on. Vibrations from these external sources may be transmitted to the projector 102 through a table 112 or other structure on which to projector 102 sits or which otherwise supports the weight of the projector 102. Projector vibration may also result from the vibration of internal projector components such as fans or motors. The projector may be particularly susceptible to these types of vibrations when the projector 102 is starting-up. Another source of movement might be slight deformations due to temperature changes during heating up. The errors that results may be less visible when the projector 102 projects onto a uniformly white or gray projection surface. However, as described above, when the projector 102 projects a color compensated image onto a variable color surface, the color mapping may amplify these errors and generate visible color error lines. Thus, after operation 508 and prior to projecting the image, operation 512 is executed where the compensation image is optimized to reduce or eliminate visible color errors that may occur due to projector pixel movement.

In operation 512, the computer 106 optimizes the compensation image based on a pixel drift estimation to form an optimized compensation image. In a sense, optimization 512 softens the granularity of mapping 612 in a particular region based on an estimate of the likelihood, magnitude and nature of mis-registration occurring in that particular region. The pixel drift estimation is a description of how the projector pixels move or how the projector pixels are likely to move as the projector 102 projects an image onto the projection surface 108. The pixel drift estimation may be produced heuristically based known or anticipated patterns of projector movement. The pixel drift estimation may also be based one or more pixel drift measurements. In one embodiment, the pixel drift estimation includes a plurality of drift maps each associated with a particular projector pixel. Each drift map may include a plurality of pixel drift locations that are each assigned a probability that represents the likelihood that the associated projector pixel will drift to that pixel drift location. A method of creating an individual drift map is described in greater detail below in connection with FIG. 7. In operation 512, the computer 106 uses the pixel drift estimation to calculate an optimized compensation image that distributes errors in the image reflected from the projection surface due to pixel movement such that visible color error lines are substantially reduced or eliminated. An example optimization operation is described in greater detail below in connection with FIG. 9.

Figure 6E:
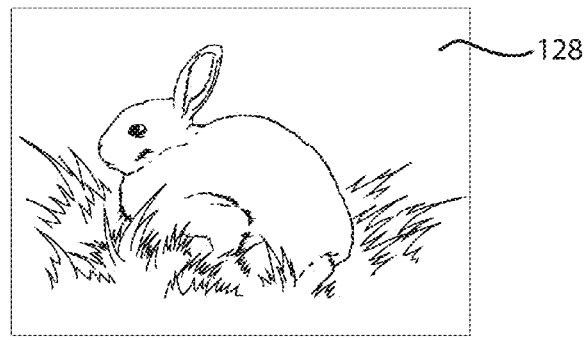
FIG. 6E is a front elevation view of an example projection image resulting from projection of the compensation image of FIG. 6C with compensation image having been optimized in accordance with embodiments discussed herein.

In operation 516, the projector 102 projects the optimized compensation image onto the projection surface 108. The optimized compensation image is calculated to distribute errors in the image reflected from the projection surface such that visible color error lines are substantially reduced or eliminated. FIG. 6E is an illustration of example optimized compensation image reflected from the projection surface 108. As illustrated in FIG. 6E, the compensatory colors in the mapping compensate for the underlying colors of the projection surface and the image is optimized such that visible color error lines that would otherwise appear due projector pixel movement do not appear or substantially less apparent.

Figure 7:
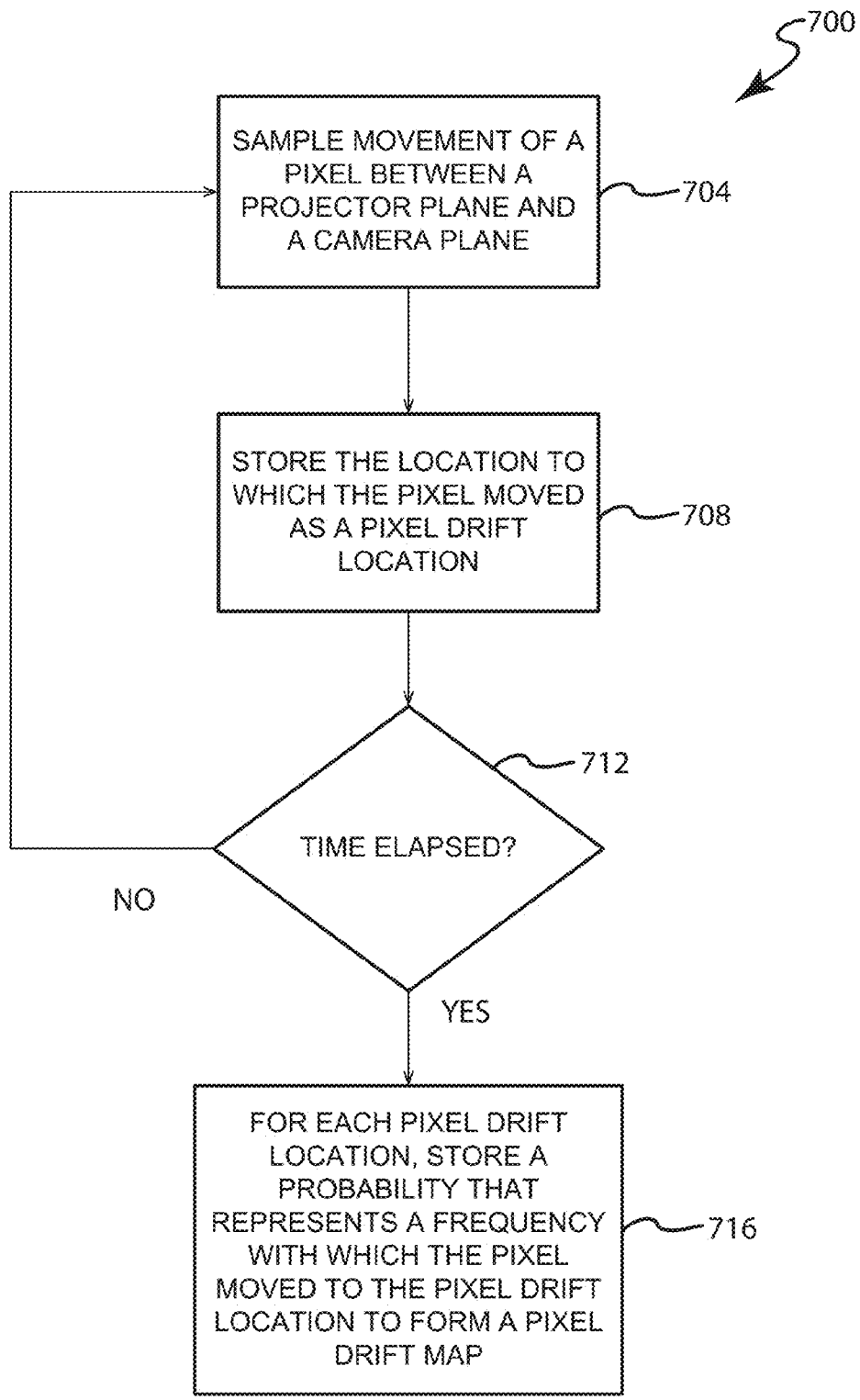
FIG. 7 is a flow chart that illustrates a method of calculating a drift map for an individual projector pixel in accordance with embodiments discussed herein.

Turning now to FIG. 7, reference is made to flow chart 700, which illustrates a method of creating a drift map for a projector pixel in accordance with embodiments discussed herein. The method illustrated by flow chart 700 will be described with reference to the system 100 shown in FIGS. 1 and 2.

Initially, in operation 704, the computer 106 samples movement of a pixel between a projector plane and a camera plane. Here, the camera 104 captures one or multiple images from the projection surface 108 that is projected by the projector 102. The computer 106 then analyzes the captured images to determine if one or more pixels have drifted from their location in the projector plane away from their corresponding location in the camera plane. In one embodiment, the sampling of operation 704 includes projecting one or multiple test images onto a projection surface 108, capturing a reflected image from the projection surface 108 with the camera 104, and comparing the reflected images to the test images. The test images can be any image such as a picture or a frame of a movie or motion picture. In another embodiment, the sampling operation of operation 704 includes projecting one or more structured light patterns onto the projection surface 108 and capturing with the camera 104 an image of the structured light patterns that are reflected from the projection surface 108. The structured light patterns can be individual pixels, a pattern of pixels arranged such that the pixels are spaced apart from each other, a pattern of vertical or horizontal bars, or the like. Following operation 704, operation 708 is executed. In one respect, using structured light patterns to calibrate the system can be advantageous when projecting onto a non-planar surface or structure. Here, the mappings of camera to projector pixels maybe carried out for each individual pixel and thus, the surface geometry can be arbitrary. More specifically, the mapping does not cast a shadow and/or occlude projector pixels form the camera's point of view.

In operation 708, the computer 106 stores the location to which the pixel moved as a pixel drift location. Here, the pixel drift location represents a specific instance of pixel movement between the projector plane and the camera plane. As described above, projector pixels can move for various reasons such as vibrations that are external or internal to the projector 102. In accordance with embodiments discussed herein, operations 704 and 708 can be repeated over a predetermined time interval such that a plurality of pixel drift locations are stored, each representing a specific instance of pixel movement between the projector plane and the camera plane. Following operation 708, operation 712 is executed.

In operation 712, the computer 106 determines if the predetermined time interval has elapsed. The time interval corresponds to an amount of time during which the computer 106 samples pixel movement. Longer time intervals may be chosen so as to acquire larger pixel drift data sets. Shorter time intervals may be chosen in the interest of time. If the computer 106 determines that the time interval has not elapsed, operation 704 is executed following operation 712 such that an additional pixel movement is sampled. If the computer 106 determines that the time interval has elapsed, operation 716 is executed following operation 712.

Figure 8A:
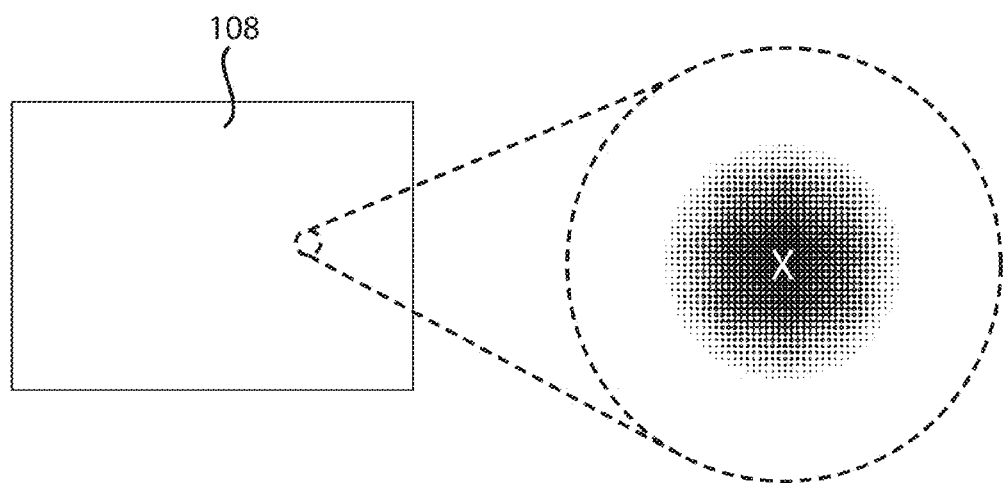
FIG. 8A is a front elevation view of an example pixel drift location pattern accumulated over time.
Figure 8B:
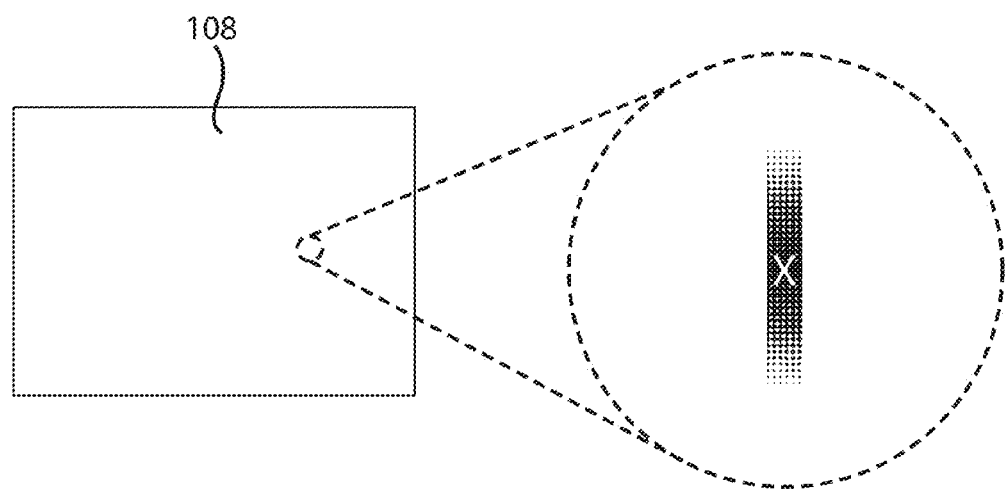
FIG. 8B is a front elevation view of another example pixel drift location pattern accumulated over time.

In operation 716, the computer 106 stores a probability for each pixel drift location that represents a frequency with which the pixel moved to the pixel drift location to form a pixel drift map. In calculating and/or storing pixel drift probabilities, the computer 106 may make use of a pattern of pixel locations that represents an accumulation of specific instances of pixel movement between the projector plane and the camera plane. FIGS. 8A and 8B are illustrations of example pixel drift location patterns that could be accumulated by the repetition of operations 704 and 708 over time. In some instances such as shown in FIG. 8A, pixel drift is fairly evenly distributed in all directions. In other instances, pixel drift may be more strongly present in one direction as compared to another. For example, as shown in FIG. 8B, pixel drift is more strongly present in vertical direction as compared to the horizontal direction. In one respect, creating a pixel drift map may include creating a probabilistic representation of the information contained in a pixel drift location pattern, such as the one shown in FIG. 8A or 8B. For example, in operation 716, the computer 106 may assign probabilities to each pixel drift location as floating point values for each pixel drift location that represent normalized weights that represent that likelihood that the projector pixel will move to the pixel drift location. Alternatively, in operation 716, the computer 106 may assign probabilities to each pixel drift location by storing a Gaussian ellipsoid that analytically describes the likelihood of that the projector pixel will move to the pixel drift location.

FIG. 7 illustrates a method of calculating a drift map for an individual projector pixel. In accordance with embodiment discussed herein, drift maps for individual projector pixels may be combined together to form a pixel drift estimation. As described above in connection with operation 512 of flow chart 500, the complete pixel drift estimation may be used to optimize a compensated image.

In forming the pixel drift estimation, it may be the case that all the pixels are sampled and all the pixel maps are calculated based on measured pixel movement. Alternatively, some embodiments may decrease processing time by sampling only a subset of the pixels. Here, are first group of pixel maps are calculated based on measured pixel movement, and a second group of pixel maps are interpolated based on the first group of pixel maps.

In some embodiments, sampling of projector pixel movement may be concentrated in areas in which color errors are anticipated to appear. As described above, color error lines due to projector pixel movement can appear on or near the borders between color regions in the projection surface. Thus, in anticipation of these errors, the projection surface can be analyzed to determine the location of these borders. For example, the projection surface can be analyzed to determine location of steep color gradients. The sampling of projector pixel movement can then be focused or concentrated in area corresponding to the borders between color regions. For example, the system may more densely sample projector pixel movement at locations corresponding to locations of steep color gradients in the projection surface.

As illustrated in FIG. 7, a drift map can be created by measuring or sampling actual pixel movement. Alternatively, one or more drift maps may be created heuristically based on known patterns of projector movement. If the projector 102 will be operating in an environment where the vibrations that could cause projector pixel movement come from a source that is known to behave in a predictable pattern, one or more drift maps could be created based on this pattern. Here, creating a drift map may include assigning probabilities to each pixel drift location based these known patterns of movement. For example, in the event that the projector will be sitting on a table during operation, it may be the case that external vibrations transmitted to the projector to the table tend to move pixels more strongly in the vertical direction than in the horizontal direction. Thus, creating a drift map for a projector pixel in this environment may include assigning higher probabilities to pixel drift location above and below the projector pixel, and assigning lower probabilities to pixel drift locations that are laterally adjacent to the projector pixel.

In certain embodiments, drift maps are created based sensor measurement that record vibrations or other movements of the projector or projection surface. Thus, as a further alternative to creating drift maps by sampling pixel movement, a motion sensor such as an accelerometer or a gyroscope scope may be placed on the projector and one or more drift maps may be created based on the projector movement that it measures. In some embodiments, the projection surface itself may be known to vibrate or shake. Here, a motion sensor may be place directly on the projection surface and drift maps created based on the measured movement. In other embodiments the projection surface may expand or shrink in response to temperature in which case temperature sensors place on or proximate to the projection surface may be used to correlate drift maps with temperature.

Figure 9:
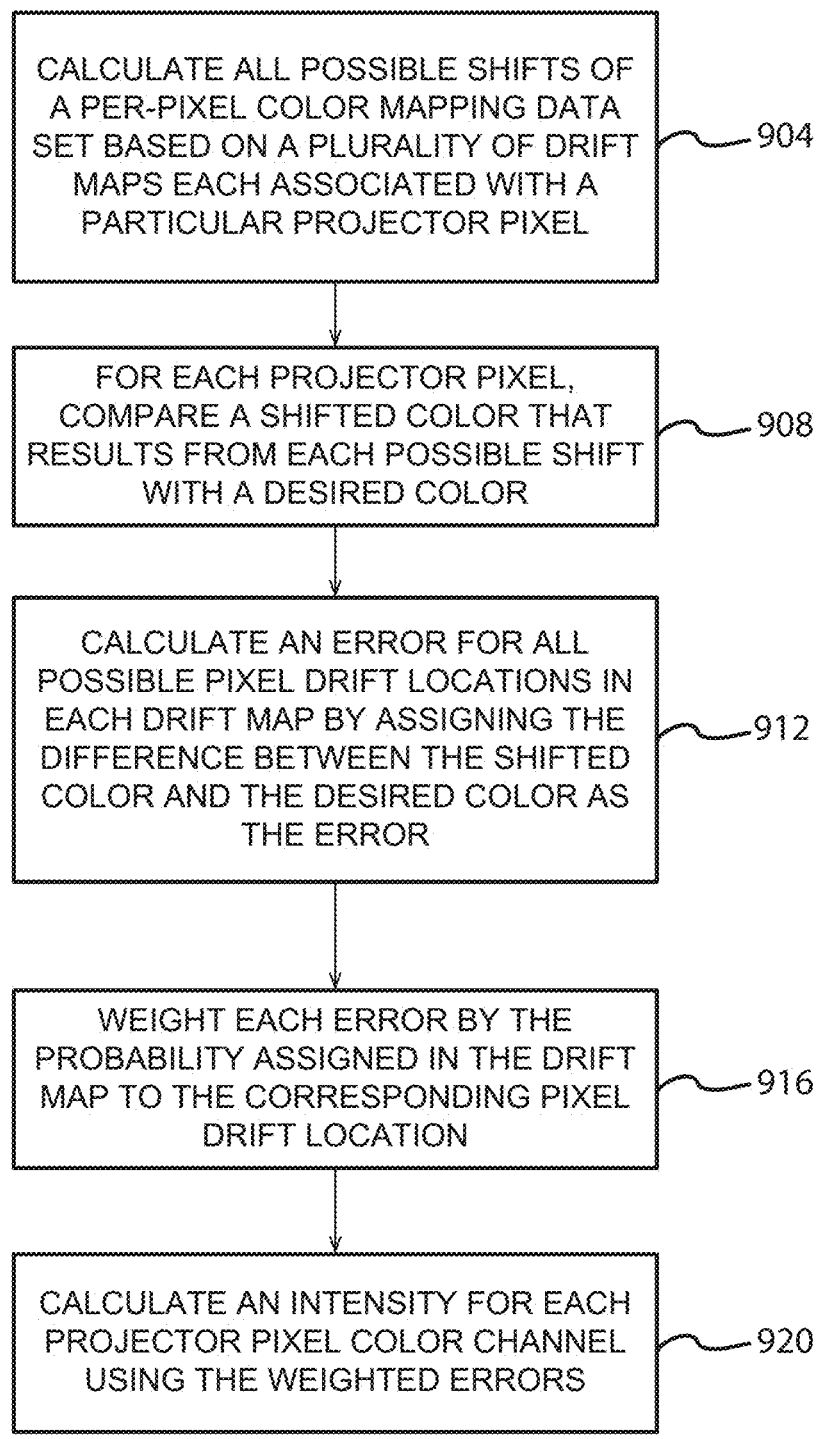
FIG. 9 is a flow chart that illustrates an example optimization operation in accordance with embodiments discussed herein.

Turning now to FIG. 9, reference is made to flow chart 900, which illustrates an example optimization operation. As described above in connection with operation 512, the computer 106 may optimize a color compensated image based on a pixel drift estimation to form an optimized compensation image. Flow chart 900 illustrates an optimization embodiment that carries out this operation.

Initially, in operation 904, the computer 106 calculates all likely or observed shifts of a per-pixel color mapping data set based on a plurality of drift maps. Here, the computer 106 takes as input the per-pixel color mapping data set used in operation 508 to compensate the input image based on characteristics in the projection surface 108. The computer calculates a plurality of shifts of the color mapping for each projector pixel where each shift corresponds to a particular pixel drift location specified by the associated pixel drift map.

In operation 908, the computer 106 compares a shifted color that results from each observed shift with a desired color. Thus, for each projector pixel, the computer 106 compares each color shift obtained in operation 908 with a desired color that is intended to be seen from the projection surface 108. More specifically, a desired color is the color that results when the un-shifted per-pixel color mapping data set is applied to the input image and projected onto the projection surface by an unmoving projector 102. A comparison to the desired color can be accomplished without actually projecting onto the projection surface by utilizing a simulation that applies an inverse color mapping to the shifted, color mapped data and compares the resulting color with the desired input color. Here, the inverse color mapping is pixel-by-pixel inverse of the color mapping that was previously calculated to neutralize or otherwise compensate colors that are present in the projection surface 108. In this way, the inverse color mapping simulates the result that would occur if the shift image were to be projected onto the projection surface.

In operation 912, the computer 106 assigns the difference between the shifted color and the desired color as an error. More specifically, the computer 106 calculates an error for all possible pixel drift locations in each drift map by assigning the difference between the shifted color and the desired color as the error. Following operation 912, operation 916 is executed.

In operation 916, the computer 106 weights each error by the probability assigned in the drift map to the corresponding pixel drift location. As described above, the probabilities associated pixel drift location may be stored as floating point values or may be specified by an analytic expression such as a Gaussian ellipsoid. In weighing each error, the computer forms a plurality of weighted errors for each projector pixel.

In operation 920, the computer 106 calculates an intensity for each projector pixel color channel using the weighted errors. In one embodiment, the computer calculates the intensities for the projector color channels so as to minimize the errors for each possible projector pixel location in the projected image. Minimizing the errors for each possible projector pixel location may be accomplished, for example, by using a non-linear solver or other methods as disclosed in U.S. patent application Ser. No. 14/180,083, the entire contents of which are herein incorporated by reference in their entirety. Once color channel pixels are calculated, the optimized compensation image may be projected onto the projection surface as described above in connection with operation 516. In this way, a desired color is approximated when the projector pixel is projected onto and reflected from the projection surface.

In some embodiments, optimizing the compensation image includes analyzing the input image to determine locations of visually recognizable content. Optimization may then be selectively applied in those areas of visually recognizable content so as to increase processing efficiency. For example, certain areas of an image may contain visually recognizable objects, while other area may contains fuzzy background colors or other noise that is not visually recognizable. Not applying optimization to those background or fuzzy areas may have little negative impact because errors in those regions may not be visibly recognizable by the human perceptual system.

Figure 10A:
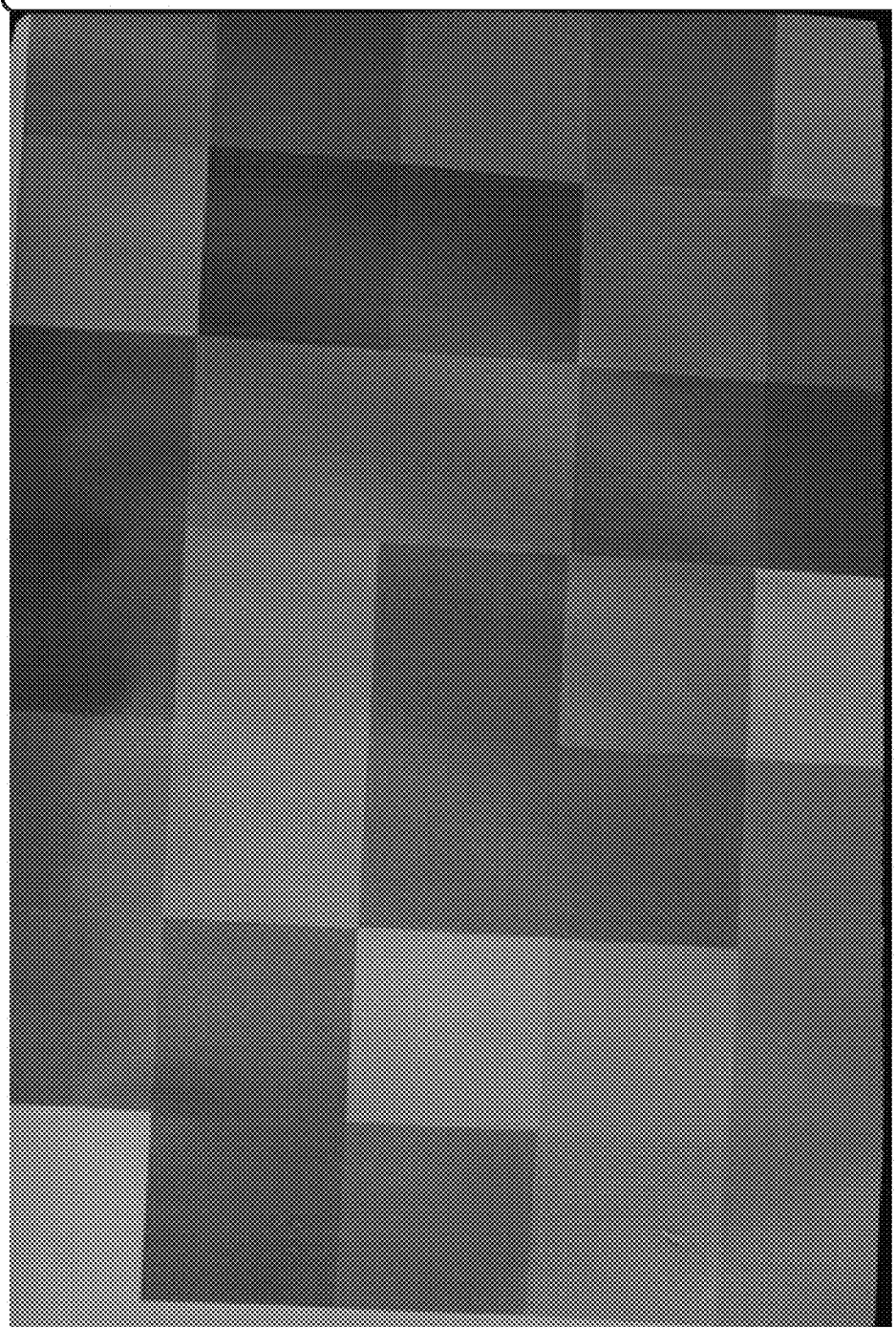
FIGS. 10A-10D are a set of images that illustrate the methods disclosed herein.
Figure 10B:
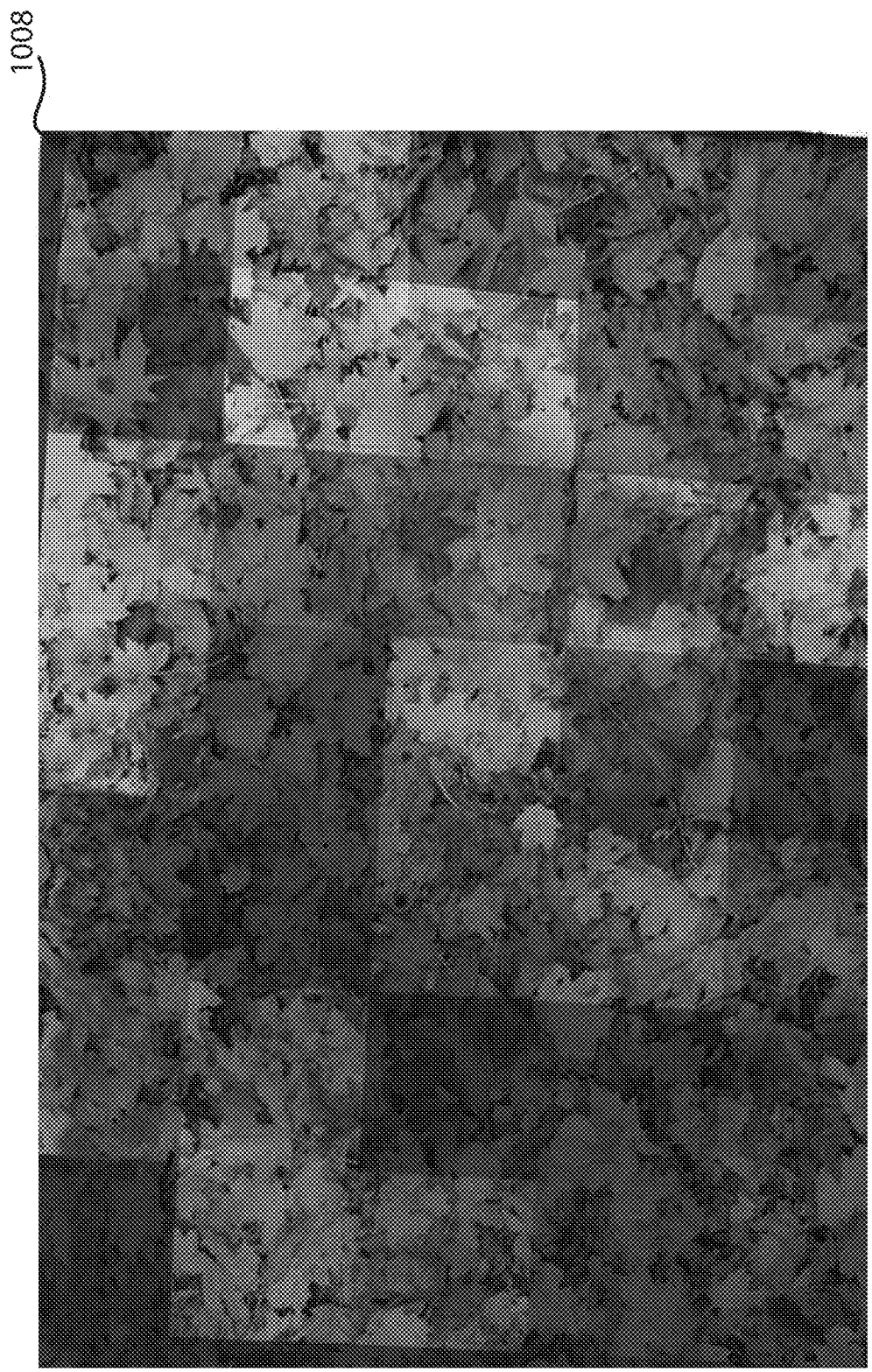
Figure 10C:
Figure 10D:
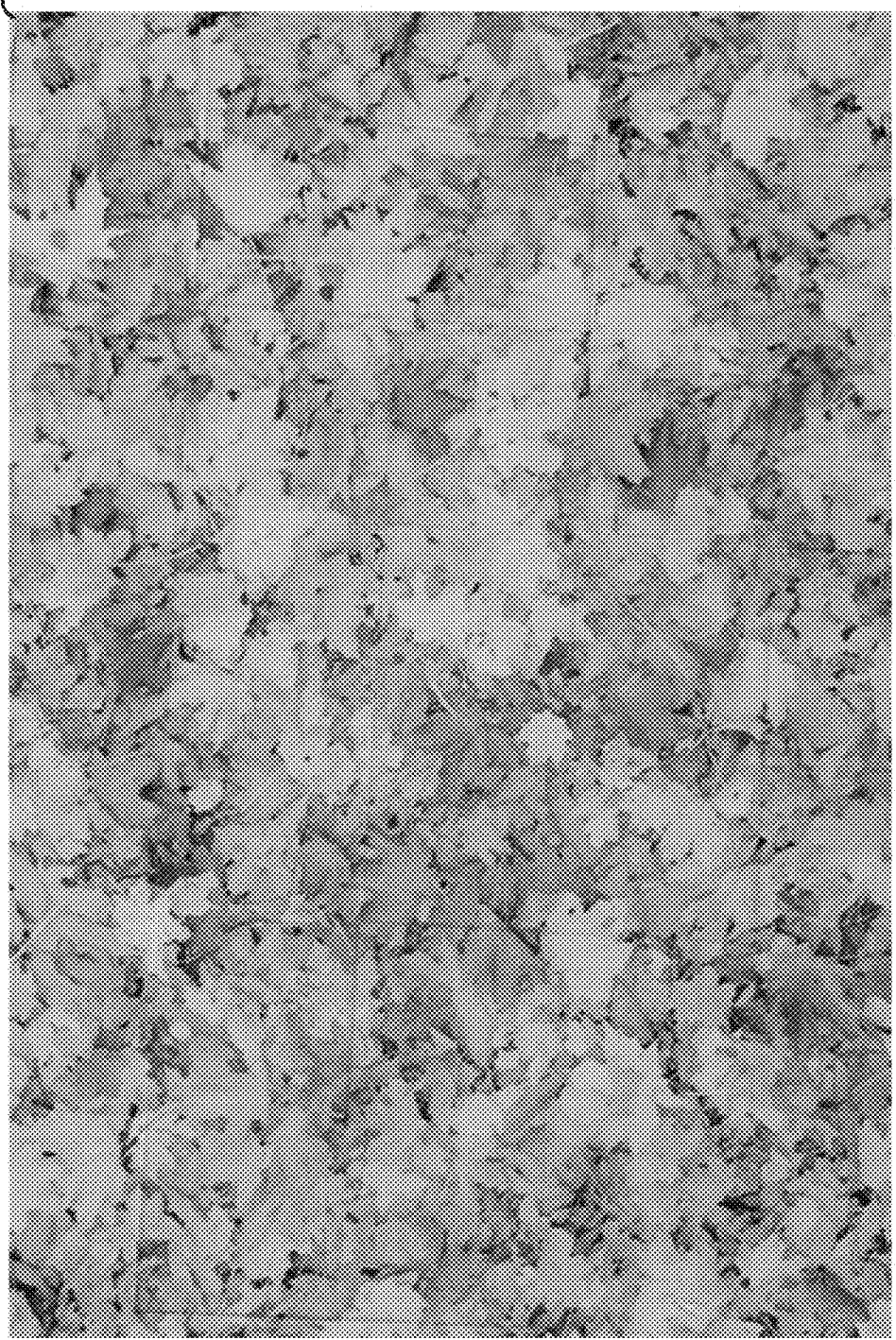

Turning now to an additional illustration of the methods disclosed herein, reference is made to FIGS. 10A-10D. FIG. 10A is an example projection surface 1004 that includes a plurality of regions having differing colors. FIG. 10B is compensation image 1008 that is produced with a color mapping that is based on the colors in the projection surface 1004 of FIG. 10A. FIG. 10C is an image 1012 of the compensation image 1008 projected onto the projection surface 1004 without having been optimized. FIG. 10D is an image 1016 of the compensation image 1008 projected onto the projection surface 1004 after having been optimized in accordance with embodiments discussed herein.

Figure 11A:
FIGS. 11A-11C are a set of images that further illustrate the methods disclosed herein.
Figure 11B:
Figure 11C:

FIGS. 11A-11C are a set of images that further illustrate the methods disclosed herein. FIG. 11A is an input image 1104 to be projected onto the projection surface 1004 shown in FIG. 10A. FIG. 11B is an image 1108 of a compensation image for the input image 1104 projected onto the projection surface 1004 without having been optimized. FIG. 11C is an image 1112 of a compensation image for the input image 1104 projected onto the projection surface 1004 after having been optimized in accordance with embodiments discussed herein.

Figure 12A:
FIGS. 12A-12C are an additional set of images that further illustrate the methods disclosed herein.
Figure 12B:
Figure 12C:

FIGS. 12A-12C are an additional set of images that further illustrate the methods disclosed herein. FIG. 12A is an input image 1204 to be projected onto the projection surface 1004 shown in FIG. 10A. FIG. 12B is an image 1208 of a compensation image for the input image 1204 projected onto the projection surface 1004 without having been optimized. FIG. 12C is an image 1212 of a compensation image for the input image 1204 projected onto the projection surface 1004 after having been optimized in accordance with embodiments discussed herein.

CONCLUSION

In methodologies directly or indirectly set forth herein, various steps and operations are described in one possible order of operation but those skilled in the art will recognize the steps and operation may be rearranged, replaced or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A projection method, comprising
compensating an input image based on at least one characteristic of a projection surface to form a compensation image;
optimizing the compensation image based on a pixel drift estimation to form an optimized compensation image, wherein the pixel drift estimation corresponds to estimated movement of at least one of the compensation image or the projection surface during projection of the compensation image; and
projecting the optimized compensation image onto the projection surface.

2. A projection method comprising
compensating an input image based on at least one characteristic of a projection surface to form a compensation image; determining a drift map for a plurality of projector pixels to form a pixel drift estimation, each drift map including pixel drift locations each assigned a probability that represents a likelihood that the projector pixel will drift to the pixel drift location; optimizing the compensation image based on the pixel drift estimation to form an optimized compensation image; and projecting the optimized compensation image onto the projection surface.

3. The projection method of claim 2, wherein, for each of the plurality of projector pixels, the operation of optimizing the compensation image comprises
calculating an error for each possible pixel drift location within the drift map associated with the projector pixel;
weighting each error by the probability assigned to the corresponding pixel drift location to form a plurality of weighted errors for the projector pixel; and
calculating an intensity for each color channel of the projector pixel using the weighted errors such that a desired color is approximated when the projector pixel is projected onto and reflected from the projection surface.

4. The projection method of claim 3, wherein the operation of calculating an error for each possible pixel drift location comprises
calculating all possible shifts of a per-pixel color mapping data set based on the drift map, the per-pixel color mapping data set being used to color compensate the input image based on colors of the projection surface;
comparing a shifted color that results from each possible shift with a desired color that results when the un-shifted per-pixel color mapping data set is applied to the input image; and
assigning the difference between the shifted color and desired color as the error.

5. The projection method of claim 2, wherein the operation of determining a drift map for each of a plurality of projector pixels comprises
projecting a test image onto the projection surface;
capturing a reflected image from the projection surface with a camera;
comparing the reflected image to the test image to determine a pixel drift sample;
repeating the operations of projecting, capturing and comparing over a period of time to form a set of drift samples; and
assigning probabilities to each pixel drift location in the drift map based on the set of drift samples.

6. The projection method of claim 2, wherein the operation of determining a drift map for each of a plurality of projector pixels comprises
projecting a structured light pattern onto the projection surface;
capturing with a camera an image of the structured light pattern that is reflected from the projection surface;
storing the image of the structure light pattern as a drift sample; and
repeating the operations of projecting, capturing and storing over a period of time to form a set of drift samples; and
assigning probabilities to each pixel drift location in the drift map based on the set of drift samples.

7. The projection of claim 2, wherein the operation of determining a drift map for each of a plurality of projector pixels comprises
assigning probabilities to each pixel drift location heuristically based on known patterns of projector movement.

8. The projection method of claim 2, wherein the operation of determining a drift map for each of a plurality of projector pixels comprises
measuring a movement of the projection surface or a projector with a sensor; and
assigning probabilities to each pixel drift location based on the measured movement.

9. The projection method of claim 2, wherein the operation of determining a drift map for each of a plurality of projector pixels comprises
assigning probabilities to each pixel drift location as floating point values for each pixel drift location that represent normalized weights that represent that likelihood that the projector pixel will move to the pixel drift location.

10. The projection method of claim 2, wherein the operation of determining a drift map for each of a plurality of projector pixels comprises
assigning probabilities to each pixel drift location by storing an analytic function that describes the likelihood that the projector pixel will move to the pixel drift location.

11. The projection method of claim 10, wherein the analytic function is a Gaussian ellipsoid.

12. The projection method of claim 2, wherein the operation of determining a drift map for each of a plurality of projector pixels comprises
sampling actual movement for a first set of projector pixels to form a first set drift maps for the pixels in the first set of projector pixels; and
interpolating a second set of drift maps for pixels not in the first set of projector pixels.

13. The projection method of claim 2, wherein the operation of determining a drift map for each of a plurality of projector pixels comprises
analyzing the projection surface to determine locations of steep color gradients; and
densely sampling projector pixel movement at locations corresponding to locations of steep color gradients in the projection surface.

14. The projection method of claim 1, further comprising analyzing the input image to determine locations of visually recognizable content;
wherein the operation of optimizing the compensated image includes only optimizing the compensated image at the locations of visually recognizable content.

15. A projection method, comprising
calculating a drift map for each of a plurality of projector pixels, each drift map including pixel drift locations each assigned a probability that represents a likelihood that the projector pixel will drift to the pixel drift location; and
determining an intensity for each color channel of each projector pixel by applying the drift maps to a per-pixel color mapping data set used to color compensate an input image based on colors of a projection surface.

16. The projection method of claim 15, wherein, for each of the plurality of projector pixels, the operation of apply the drift maps to the per-pixel color mapping data set comprises
calculating an error for each possible pixel drift location within the drift map associated with the projector pixel;
weighting each error by the probability assigned to the corresponding pixel drift location to form a plurality of weighted errors for the projector pixel; and
calculating an intensity for each color channel of the projector pixel using the weighted errors such that a desired color is approximated when the projector pixel is projected onto and reflected from the projection surface.

17. The projection method of claim 16, the intensity for each color channel is calculated so as to minimize the errors for each possible projector pixel location in the projected image.

18. The projection method of claim 16, wherein the operation of calculating an error for each possible pixel drift location comprises
calculating all possible shifts of a per-pixel color mapping data set based on the drift map;
comparing a shifted color that results from each possible shift with a desired color that results when the un-shifted per-pixel color mapping data set is applied to the input image; and
assigning the difference between the shifted color and desired color as the error.

19. A projection method, comprising
sampling over time of plurality of movements of a pixel between a projector plane and a camera plane;
for each location to which the pixel moved at least once, storing the location as a pixel drift location;
for each pixel drift location, storing a probability that represents a frequency with which the pixel moved to the pixel drift location to form a pixel drift map; and
selecting an intensity for the color channels of the pixel based on the pixel drift map and a color mapping for the pixel from the projector plane to the camera plane across a projection surface.

20. The projection method of claim 19, wherein the operation of sampling over time of plurality of movements of a pixel comprises
projecting a test image onto the projection surface;
capturing a reflected image from the projection surface with a camera;
comparing the reflected image to the test image; and
repeating the operations of projecting, capturing and comparing over a period of time.

21. The projection method of claim 19, wherein the operation of sampling over time of plurality of movements of a pixel comprises
projecting a structured light pattern onto the projection surface;
capturing with a camera an image of the structured light pattern that is reflected from the projection surface; and
repeating the operations of projecting and capturing over a period of time.

22. The projection of claim 19, wherein the pixel is a first pixel and the pixel drift map is a first pixel drift map, the method further comprising
interpolating a second pixel drift map based on at least the first pixel drift map.

* * * * *